US006717305B2

(12) United States Patent
Ruberl et al.

(10) Patent No.: US 6,717,305 B2
(45) Date of Patent: Apr. 6, 2004

(54) APPARATUS HAVING AN ELECTROACOUSTIC TRANSDUCER FORMING A SOUND REPRODUCING MEANS AND A PART OF VIBRATION GENERATING MEANS

(75) Inventors: Ernst Ruberl, Guntramsdorf (AT); Heinz Renner, Kaltenleutgeben (AT); Juha Reinhold Backman, Espoo (FI)

(73) Assignee: Koninklijke Philips Electronics N.V., Eindhoven (NL)

( * ) Notice: Subject to any disclaimer, the term of this patent is extended or adjusted under 35 U.S.C. 154(b) by 42 days.

(21) Appl. No.: 09/784,430

(22) Filed: Feb. 15, 2001

(65) Prior Publication Data

US 2001/0017491 A1 Aug. 30, 2001

(30) Foreign Application Priority Data

Feb. 17, 2000 (EP) .......................................... 00890044

(51) Int. Cl.[7] ................................................ H02K 7/06
(52) U.S. Cl. .......................................... 310/81; 310/12
(58) Field of Search ............................. 310/81, 12, 13; 381/396, 152, 199, 338; 340/407, 384 R

(56) References Cited

U.S. PATENT DOCUMENTS 4,931,765 A * 6/1990 Rollins et al. ........... 340/407.1
5,107,540 A 4/1992 Mooney et al. ............. 381/192
5,172,092 A * 12/1992 Nguyen et al. .......... 340/311.1
5,214,710 A * 5/1993 Ziegenberg et al. ........ 381/199
5,299,176 A * 3/1994 Tibbetts ...................... 367/175
5,303,209 A * 4/1994 Frasl .......................... 367/174
5,903,076 A * 5/1999 Suyama ....................... 310/81
6,011,333 A * 1/2000 Yamaguchi et al. .......... 310/81
6,151,402 A * 11/2000 Azima et al. ............... 381/396
6,178,252 B1 * 1/2001 Frasl et al. ................. 381/424
6,192,136 B1 * 2/2001 Azima et al. ............... 381/338

FOREIGN PATENT DOCUMENTS

EP 0906790 A1 4/1999

* cited by examiner

*Primary Examiner*—Thanh Lam
(74) *Attorney, Agent, or Firm*—Steven R. Biren

(57) ABSTRACT

In an apparatus (1) having an electroacoustic transducer (12) which includes a magnet system (13) generating a useful magnetic field and a stray magnetic field, a sound generating coil arranged in the useful field to associate with a diaphragm for generating an acoustic sound wave, and at least one movably mounted vibration generating coil (36, 37) arranged in the stray field area of the magnet system (13) for generating vibration perceptible by a user, the vibration generating coil (36, 37) being preferably also connected to a metal part (38) which consists of a soft-magnetic material.

20 Claims, 2 Drawing Sheets

APPARATUS HAVING AN ELECTROACOUSTIC TRANSDUCER FORMING A SOUND REPRODUCING MEANS AND A PART OF VIBRATION GENERATING MEANS

The invention relates to an apparatus having an electroacoustic transducer, and further relates to an electroacoustic transducer.

BACKGROUND AND SUMMARY OF THE INVENTION

Such an apparatus, which takes the form of a mobile telephone, and such an electroacoustic transducer are known from, for example the patent document U.S. Pat. No. 5,903,076 A. In the solution known from said patent document the moving coil of the electroacoustic transducer, which moving coil is arranged to receive sound signals for the generation of acoustic sound waves with the aid of the transducer's diaphragm, which is attached to the moving coil, is also used for the generation of perceptible vibrations. In order to generate such perceptible vibrations the moving coil of the transducer, which is disposed in the useful magnetic field of the magnet system, is arranged to receive an a.c. signal of comparatively low frequency, which causes the moving coil, which is disposed in the useful magnetic field of the magnet system, to produce vibrations of such a high amplitude that a part of the diaphragm which is attached to the moving coil and which serves as a vibration generating part, strikes against a stationary vibration generating part in cyclic succession, which cyclically recurrent striking of the vibration generating part of the diaphragm against the stationary vibration generating part leads to the desired generation of perceptible vibrations, which are readily perceptible by a user. The known solution has the problem that in the electroacoustic transducer, in order to achieve a high-quality generation of sound signals the moving masses, i.e. the masses of the moving coil and the transducer parts connected to the moving coil, should be minimal, on the one hand, and in order to achieve a maximal vibratory effect, the moving masses, i.e. the moving masses of the moving coil and the transducer parts connected to the moving coil, should be maximal, on the other hand. This means that contradictory requirements apply, which can only be solved by a compromise but this requires trade-offs both in view of a sound signal generation of the highest possible quality and in view of a maximal vibratory effect and it is therefore not possible to achieve an optimum result for neither of the goals. Furthermore, with the known solution the moving coil and the diaphragm are subjected to comparatively high mechanical loads, which is unfavorable in view of a minimal wear and a long lifetime.

It is an object of the invention to preclude the aforementioned problems and to provide an improved apparatus and an improved electroacoustic transducer and to achieve both an optimum sound signal reproduction and an optimum vibratory effect with the simplest possible means and without the moving coil and the diaphragm being subjected to excessive mechanical loads.

According to the invention, in order to achieve the aforementioned object, an apparatus having an electroacoustic transducer is provided, which transducer has a magnet system which generates a useful magnetic field in a useful field area and which generates a stray magnetic field in a stray field area, and which magnet system is used to realize vibration generating means for the generation of vibrations which are perceptible by a user of the apparatus, wherein the vibration generating means include, in addition to the magnet system of the transducer, at least one movably mounted vibration generating coil arranged in the area of the stray field generated by means of the magnet system of the transducer.

Furthermore, according to the invention, in order to achieve the afore-mentioned object, an electroacoustic transducer is provided, which has a magnet system which generates a useful magnetic field in a useful field area and which generates a stray magnetic field in a stray field area, and which magnet system is used to realize vibration generating means for the generation of vibrations which are perceptible by a user of the apparatus, wherein the vibration generating means include, in addition to the magnet system of the transducer, at least one movably mounted vibration generating coil arranged in the area of the stray field generated by means of the magnet system of the transducer.

As a result of the provision of the characteristic features in accordance with the invention it is achieved by means of a very simple construction that an optimum sound signal generation is guaranteed using the magnet system of the electroacoustic transducer and with the aid of the moving coil included in this transducer and disposed in the useful field area and that an optimum vibratory effect is guaranteed with the aid of the at least one vibration generating coil disposed in the stray field area, which is particularly so because the masses of the moving coil and the parts connected to the moving coil and the masses of the at least one vibration generating coil and any parts connected to the at least one vibration generating coil can be selected independently of one another and can therefore each be dimensioned for an optimum result. Moreover, excessive mechanical loading of the moving coil is thus avoided.

In an apparatus in accordance with the invention and in an electroacoustic transducer in accordance with the invention the desired result can be achieved with only one vibration generating coil. However, it has proved to be very advantageous when, in addition, the vibration generating means include two movably mounted vibration generating coils arranged in the stray field area, and the two vibration generating coils are arranged in series opposition or in anti-parallel characteristic. In this way, it is achieved that the stray magnetic field of the magnet system, which field is oppositely poled at the two magnet ends (north pole and south pole), is utilized better and, as a result of this, a better vibratory effect is achieved.

In an apparatus in accordance with the invention and an electroacoustic transducer in accordance with the invention it has proved to be particularly advantageous when, in addition, the vibration generating means include, in addition to the at least one vibration generating coil, a metal part which is mechanically connected to the at least one vibration generating coil and which consists of a soft-magnetic material, and when the magnet system is basically ring-shaped, and the magnet system generates the stray magnetic field, which emanates from its outer peripheral area, and the at least one vibration generating coil is annular and is arranged to be coaxial with the axis of the magnet system and is mounted so as to be movable parallel to the axis of the magnet system. In this way, it is achieved that with the aid of the metal part of a soft magnetic material the stray magnetic field is enhanced as regards its direction and magnitude in the area in which the at least one vibration generating coil is disposed and, as a consequence, an improved vibratory effect is obtained. Furthermore, this solution has the advantage that the masses moved by means of the at least one vibration generating coil is increased substantially by the mass of the metal part, which is also advantageous for an optimum vibratory effect.

In an apparatus in accordance with the invention it has further proved to be advantageous when, in addition, an a.c. generator has been provided, which generator is adapted to generate an a.c. signal having a frequency of, preferably, between 50 Hz and 200 Hz, and the a.c. generator is connected to the at least one vibration generating coil in an electrically conductive manner and supplies the a.c. signal generated by it to the at least one vibration generating coil. This provides an embodiment having a vibration generating coil of a maximal diameter, which is advantageous in view of a simple construction and in view of an optimum vibratory effect.

The above-mentioned as well as further aspects of the invention will become apparent from the embodiments described hereinafter by way of example and will be elucidated with reference to these examples.

BRIEF DESCRIPTION OF THE DRAWING

The invention will now be described in more detail with reference to the drawings, which shows some embodiments given by way of example but to which the invention is not limited.

DETAILED DESCRIPTION OF THE PREFERRED EMBODIMENT

Figure 1:
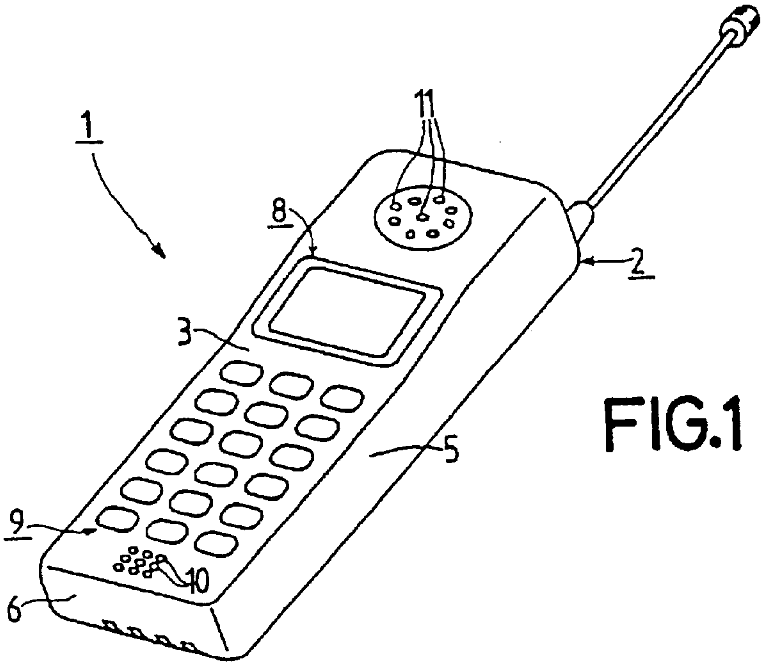
FIG. 1 is an oblique top view of an apparatus in accordance with a first embodiment of the invention.
Figure 2:
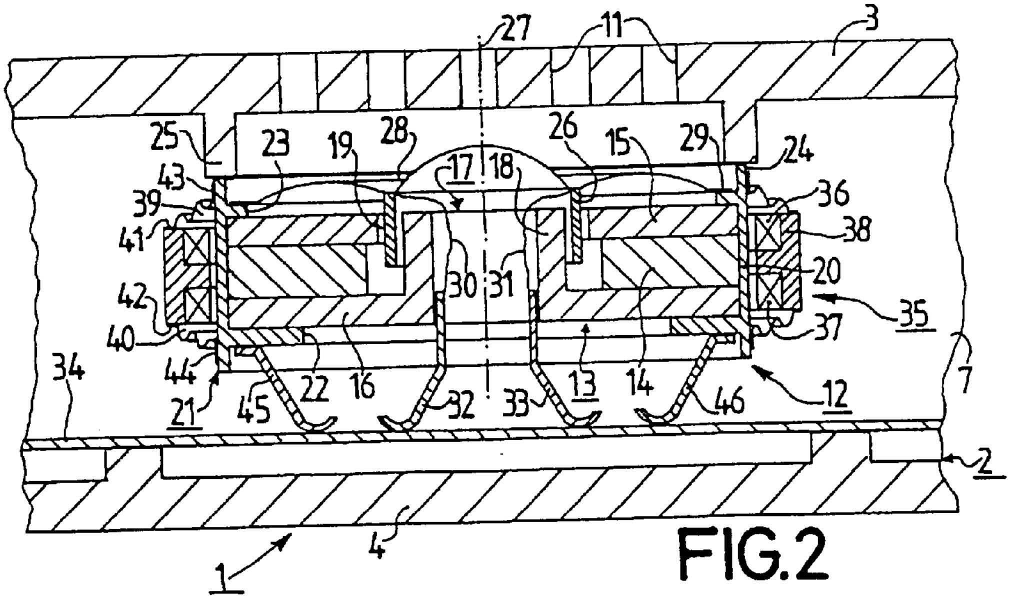
FIG. 2 is cross-sectional view which shows a part of the apparatus of FIG. 1 to a larger scale than FIG. 1.

FIGS. 1 and 2 show an apparatus 1, which takes the form of a so-called mobile telephone. The apparatus 1 has a housing 2 having an upper wall 3, a bottom wall 4, a first long side wall (not referenced), a second long side wall 5, a first short side wall 6 and a second short side wall 7. A display device 8 and a keypad 9 have been provided in the area of the upper wall 3. Furthermore, first sound transmission apertures 10 and second sound transmission apertures 11 have been provided in the area of the upper wall 3. The first sound transmission apertures 10 permit the passage of sound waves to a microphone accommodated in the apparatus 1. The second sound transmission apertures 11 permit the sound waves to pass from an electroacoustic transducer 12 accommodated in the apparatus 1 to the exterior of the apparatus 1, in order to allow these sound waves to reach an ear of a user of the apparatus 1.

The electroacoustic transducer 12 takes the form of a so-called loudspeaker capsule. The transducer 12 has a magnet system 13. The magnet system 13 consists of a ring-shaped magnet 14 on whose upper side an annular cover disc 15 is disposed and on whose lower side an annular core disc 16 of a yoke 17 is disposed. The yoke 17 consists of the annular core disc 16 and of a hollow cylindrical yoke portion 18, whose end which is remote from the core disc 16 extends into the area of the cover disc 15, namely in such a manner that an annular air gap 19 is formed between the cover disc 15 and the yoke portion 18.

In the transducer 12 the cover disc 15, the magnet 14 and the core disc 16 of the yoke 17 have the same outer diameter. In their peripheral area the cover disc 15, the magnet 14 and the core disc 16 are enclosed by a hollow cylindrical portion 20 of a transducer housing 21 and are thus radially positioned with respect to one another. In addition to the hollow cylindrical portion 20 the transducer housing 21 has a lower end ring 22 and an upper end ring 23. the three parts 14, 15 and 17 of the transducer 12 are axially positioned with respect to one another and connected to one another with the aid of the two end rings 22 and 23. In the present case, the transducer housing 21 is formed by encapsulation of the magnet system 13. The transducer 12 is mechanically secured in the apparatus 1 with the aid of the transducer housing 21, namely by means of an adhesive joint, not visible in FIG. 2, between the free end 24 of the hollow cylindrical portion 20, which free end faces the upper wall 3, and a hollow cylindrical projection 25 of the upper wall 3 of the housing 2. It is to be noted that, in addition, the transducer 12 may be secured in the housing 2 of the apparatus 1 with the aid of further fixing means.

A moving coil 26 wound from coil wire is arranged in the air gap 19. By means of an adhesive joint the moving coil 26 is attached, in known manner, to a diaphragm 28 which is capable of vibrating in the direction of a transducer axis 27. In its outermost circumferential area the diaphragm 28 has an annular mounting portion 29. The diaphragm 28 is connected to the upper end ring 23 of the transducer housing 21 by the mounting portion 29 with the aid of an adhesive joint.

Two coil connecting leads 19 lead away from the moving coil 26. The first coil connecting lead 30 leads to a first moving coil terminal contact 32. The second coil connecting lead 31 leads to a second coil terminal contact 33. The two moving coil terminal contacts 32 and 33 take the form blade spring contacts which except for their bent free ends are covered with an insulating lacquer coating and are mechanically connected to the yoke 17. The bent free ends of the two moving coil terminal contacts 32 and 33 engage against a printed circuit board 34 mounted in the apparatus 1 and having conductor tracks, which are not visible in FIG. 2, which conductor tracks lead to a sound signal source, not shown, by which the moving coil 26 can be driven with sound signals, in order to generate sound signals with the aid of the diaphragm 28, which sound signals correspond to a received telephone message.

In the area of the useful field, i.e. in the air gap 19, the magnet system 13 generates a useful magnetic field, in which the moving coil 26 is disposed, as a result of which acoustic sound waves can be produced in known manner by means of the moving coil 26 and the diaphragm 28. However, in a tray field area the magnet system 13 also generates a stray magnetic field. In the present case, in which the magnet system 13 is basically ring-shaped, the magnet system 13 generates said stray magnetic field, which emanates from its outer circumferential area and which passes freely through the hollow cylindrical portion 20 of the plastic transducer housing 21.

The magnet system 13 of the transducer 12 is, in addition, employed to realize vibration generating means 35. The vibration generating means 35 serve to generate vibrations perceptible by a user of the apparatus 1. With the aid of the perceptible vibrations it is possible to signal a user of the apparatus 1 that a telephone call is to be answered with the apparatus 1.

In the apparatus 1 the vibration generating means 35 include, in addition to the magnet system 13 of the transducer 12, two vibration generating coils 36 and 37, which are arranged in the area of the stray field generated by the magnet system 13 of the rectifier diode 12 and which are mounted so as to be movable with respect to the transducer 12 and the housing 2 of the apparatus 1. In the present case, the two vibration generating coils 36 and 37 are ring-shaped and are arranged so as to be coaxial with the transducer axis 27 and so as to be movable parallel to the transducer axis 27. In addition to the two vibration generating coils 36 and 37 the vibration generating means 35 include a metal part 38 which is mechanically connected to the two vibration generating coils 36 and 37 and which consists of a soft-magnetic material. The metal part 38 consists of soft iron. The metal part 38 is also basically ring-shaped, the metal part 38 being substantially T-shaped in a radial sectional view, as is apparent from FIG. 2. The two recessed portions formed by the T-shaped form of the metal part 38 accommodate the two vibration generating coils 36 and 37. The two vibration generating coils 36 and 37 and the metal part 38 are mechanically connected to one another by means of adhesive joints.

For movably mounting the metal part 38 and the two vibration generating coils 36 and 37 the apparatus 1 has two bellows-like mounting elements 39 and 40 having a plurality of corrugations in a radial sectional view. Each of the two mounting elements 39 and 40 has a radial peripheral portion, 41 and 42 respectively, and an axial peripheral portion, 43 and 44 respectively. The radial peripheral portions 41 and 42 are connected to the metal part 38. The axial peripheral portions 43 and 44 are connected to the hollow cylindrical portion 20 of the transducer housing 21. In this way, the metal part 38 and the two vibration generating coils 36 and 37 are movably mounted by means of the two mounting elements 39 and 40, in such a manner that the metal part 38 and the two vibration generating coils 36 and 27 can perform vibratory movements parallel to the transducer axis 21, which result in vibrations in the apparatus 1, which vibrations are perceptible via the housing 2 of the apparatus 1. The two mounting elements 39 and 40 are made of a plastic but they may alternatively be made of a textile fabric impregnated with a phenolic resin. Parts which greatly resemble the two mounting elements 39 and 40 are commonly known from the field of electroacoustic transducers as so-called centering rings, also referred to as spiders.

The two vibration generating coils 36 and 37 have coil connecting leads but these are not shown in FIG. 2. The coil connecting leads, not shown, of the two vibration generating coils 36 and 37 lead to vibration generating coil terminal contacts 45 and 46, which are also formed by blade spring contacts which, except for the areas of their bent free ends, are covered with an insulating lacquer coating and which are attached to the lower end ring of the transducer housing 21 and engage against the printed circuit board 34 with their bent free ends, thus being in electrically conductive contact with conductor tracks of the printed circuit board.

Figure 4:
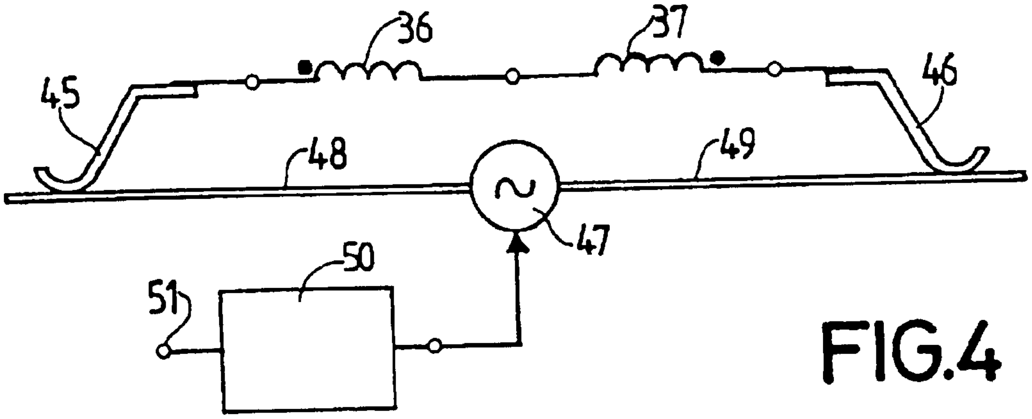
FIG. 4 is a circuit diagram of a circuit of the apparatus shown in FIGS. 1 and 2.

FIG. 4 shows a circuit diagram which includes the two vibration generating coils 36 and 37 of the apparatus 1. As is apparent from FIG. 4, the two vibration generating coils 36 and 37 are arranged in series opposition, which is achieved by an appropriate choice of the winding direction of each of the two vibration generating coils 36 and 37. As is further apparent from FIG. 4, the apparatus 1 includes an a.c. generator 47. The a.c. generator 47 is adapted to generate an a.c. signal of a frequency of approximately 150 Hz. Sinewave signals of other frequencies are also possible, for example of 100 Hz or 200 Hz. The a.c. generator 47 is connected to the two vibration generating coils 36 and 37 in an electrically conductive manner via two conductor tracks 48 and 49 of the printed circuit board 34, which is not shown in FIG. 4, and via the two vibration generating coil terminal contacts 45 and 46. The a.c. generator 47 can be controlled and activated by a control stage 50. The control stage 50 has an input 51 to which a ringing signal received by the apparatus 1 can be applied. The control stage 50 detects the reception of such a calling signal, upon which a control signal is generated, which is applied from the control stage 50 to the a.c. generator 47, as a result of which the a.c. generator 47 is activated and, consequently, supplies the generated a.c. signal to the two vibration generating coils 36 and 37. In this way, it is achieved that in response to the reception of a calling signal by the apparatus 1 the vibration generating means 35 generate vibrations which are perceptible by the user of the apparatus 1, as a result of which the user's attention is drawn to the reception of a call.

Figure 3:
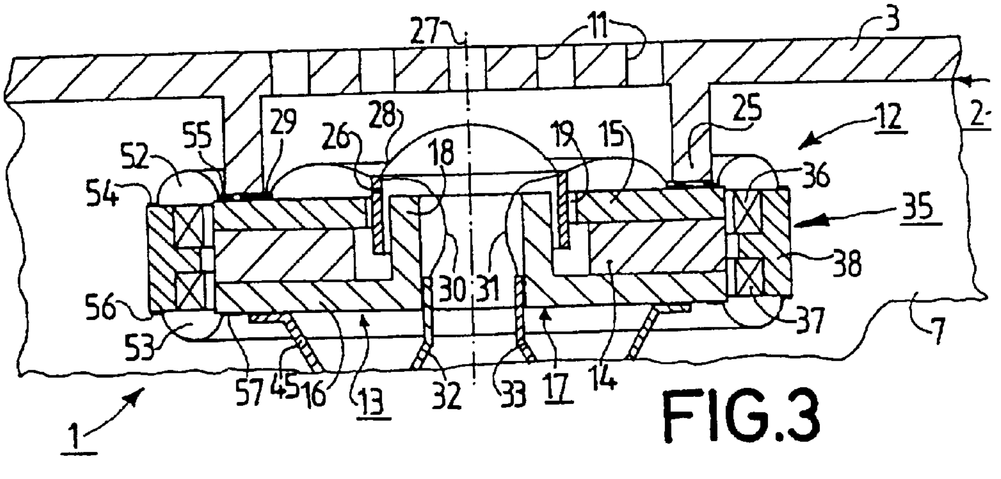
FIG. 3 shows, in a manner similar to FIG. 2, a part of an apparatus in accordance with a second embodiment of the invention.

In the apparatus 1 shown in FIG. 3 the connections between the cover disc 15 and the magnet 14 and the yoke 17 of the magnet system 13 are formed by adhesive joints between the cover disc 15 and the magnet 14 and between the magnet 14 and the core disc 16 of the yoke 17. The annular mounting portion 29 of the diaphragm 28 is connected directly to the cover disc 15 with the aid of an adhesive joint.

For movably mounting the metal part 38 and the two vibration generating coils 36 and 37 the apparatus 1 shown in FIG. 3 has two mounting elements 52 and 53 which are channel-shaped in a radial sectional view. Each of the two mounting elements 52 and 53 has two annular peripheral portions 54, 55 and 56, 57, respectively, which extend in radial directions, of which the peripheral portions 54 and 56 are connected to the metal part 38 and the peripheral portions 55 and 57 are connected to the magnet system 13, the peripheral portion 55 being attached to the cover disc 15 and the peripheral portion 57 being attached to the annular core disc 16 of the yoke 17. The joints between the peripheral portions 54, 55, 56 and 57 and the metal part 38, the cover disc 15 and the core disc 16 are each formed by an adhesive joint.

In the present case, the transducer 12 is also secured to an annular projection 25 of the upper wall 3 of the housing 2, which is also effected by means of an adhesive joint. The apparatus 1 shown in FIG. 3 may also be provided with additional fixing means for securing the transducer 12 in the housing 2.

It is to be noted that in the apparatus 1 shown in FIG. 3 the vibration generating coil terminal contacts 45 and 46 are glued to the annular core disc 16 of the yoke 17.

Figure 5:
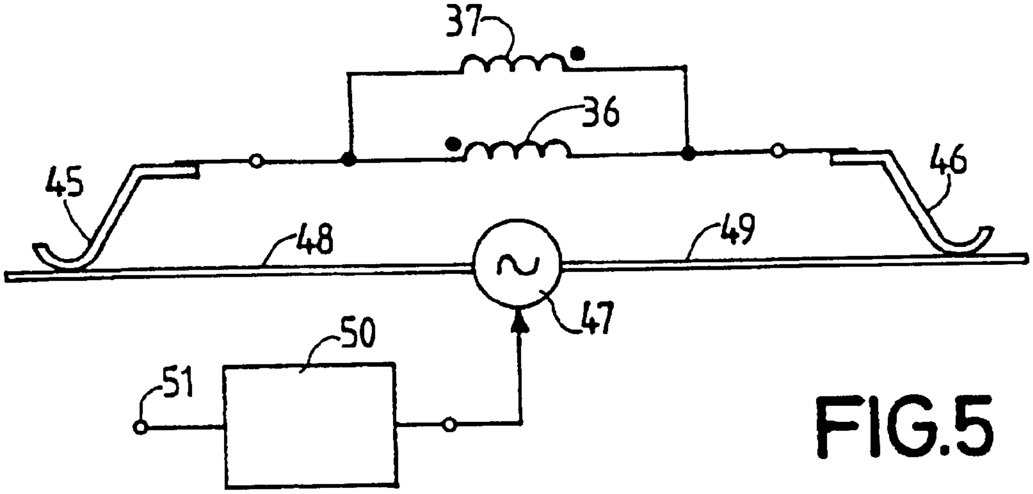
FIG. 5 shows a circuit diagram of a circuit of the apparatus shown in FIG. 3.

FIG. 5 shows a circuit diagram which includes the two vibration generating coils 36 and 37 of the apparatus 1 shown in FIG. 3. As is apparent from FIG. 5, the two vibration generating coils 36 and 37 used in the present case are arranged in anti-parallel with one another. Apart from this, there are no differences with respect to the circuit diagram shown in FIG. 4 for the apparatus 1 shown in FIGS. 1 and 2.

In both apparatuses 1 described hereinbefore the dimension of the metal part 38 together with the two vibration generating coils 36 and 37 in the direction of the transducer axis 27 is slightly smaller than the dimension of the magnet system 13 in this direction. Tests have shown that it is very advantageous when said dimension of the metal part 38 plus the two vibration generating coils 36 and 37 is greater than said dimension of the magnet system 13.

The invention is not limited to the two apparatuses described hereinbefore. Instead of two vibration generating coils an apparatus in accordance with the invention may alternatively include only one vibration generating coil. If desired, however, it is also possible to provide more than two vibration generating coils. Moreover, the metal part may be dispensed with, in which case care must be taken that the at least one vibration generating coil has a mass which is high enough to ensure a satisfactorily perceivable vibratory effect. It is likewise possible to provide other means for movably mounting one or two vibration generating coils. For example, between a magnet system and a vibration generating coil disposed in the stray field area of the magnet system a construction resembling a ball-bearing configuration may be provided for movably supporting the vibration generating coil. Alternatively, metal mounting elements may be provided for the movable mounting, which elements each comprise two mutually concentric annular discs and of a plurality of limbs which interconnect the two annular discs, which limbs may have a form which is linear or helical or V-shaped in plan view. Such mounting elements may also consist of a plastic with conductor tracks integrated in the plastic, as is known per se from so-called flexible printed circuits, in which case the integrated conductor tracks can be employed for the electrical connection of vibration generating coils.

What is claimed is:

1. An apparatus having an electroacoustic transducer, said transducer comprising:

a magnet system which generates a useful magnetic field in a useful field area and a stray magnetic field in a stray field area, sound generating means arranged in said useful magnetic field for generating acoustic sound wave, and vibration generating means for generating vibrations perceptible by a user of the apparatus, wherein the vibration generating means is separate from the sound generating means and comprises at least one movably mounted vibration generating coil arranged in the stray magnetic field generated.

2. An apparatus as claimed in claim 1, wherein the vibration generating means include two movably mounted vibration generating coils arranged in the stray filed area, and the two vibration generating coils are arranged in serried opposition or in anti-parallel.

3. An apparatus as claimed in claim 1, wherein the vibration generating means include, in addition to the at least one vibration generating coil, a metal part which is mechanically connected to the at least one vibration generating coil and which consists of a soft-magnetic material.

4. An apparatus as claimed in claim 1, wherein the magnet system is basically ring-shaped, and the magnet system generates the stray magnetic field, which emanates from its outer peripheral area, and the at least one vibration generating coil is annular and is arranged to be coaxial with the axis of the magnet system and is mounted so as to be movable parallel to the axis of the magnet system.

5. An apparatus as claimed in claim 1, further comprising an a.c. generator adapted to generate an a.c. signal having a frequency of, preferably, between 50 Hz and 200 Hz, and the a.c. generator is connected to the at least one vibration generating coil in an electrically conductive manner and supplies the a.c. signal generated by it to the at least one vibration generating coil.

6. The apparatus of claim 1 wherein said sound generating means comprises a coil and a diaphragm activated by said coil for generating said acoustic sound wave.

7. An electroacoustic transducer, comprising:

a magnet system which generates a useful magnetic field in a useful field area and a stray magnetic field in a stray field area, sound generating means arranged in said useful magnetic field for generating acoustic sound wave, and vibration generating means for generating vibrations perceptible by a user of the apparatus, wherein the vibration generating means is separate from the sound generating means comprises at least one movably mounted vibration generating coil arranged in the stray magnetic field.

8. An electroacoustic transducer as claimed in claim 7, wherein the vibration generating means include two movably mounted vibration generating coils arranged in the stray field area, and the two vibration generating coils are arranged in series opposition or in anti-parallel.

9. An electroacoustic transducer as claimed in claim 7, wherein the vibration generating means include, in addition to the at least one vibration generating coil, a metal part which is mechanically connected to at least one vibration generating coil and which consists of a soft-magnetic material.

10. An electroacoustic transducer as claimed in claim 7, wherein the magnet system is basically ring-shaped, and the magnet system generates the stray magnetic field, which emanates from its outer peripheral area, and the at least one vibration generating coil is annular and is arranged to be coaxial with the axis of the magnet system and is mounted so as to be movable parallel to the axis of the magnet system.

11. The electroacoustic transducer of claim 7 wherein said sound generating means comprises a coil and a diaphragm activated by said coil for generating said acoustic sound wave.

12. An electroacoustic transducer, comprising:

a magnet system for generating a useful magnetic field and a stray magnetic field;

sound generating means for generating acoustic sound wave, said sound generating means comprising a first coil placed in one of said two magnetic fields; and vibration means for generating vibration perceptible by an user, said vibration means comprising one or more second coils placed in the other of said two magnetic fields.

13. The electroacoustic transducer of claim 12 wherein said magnetic field comprises a useful magnetic field and a stray magnetic field, and wherein said first coil is located in said useful magnetic field, while said one or more second coils are located in said stray magnetic field.

14. The electroacoustic transducer of claim 13 wherein said magnet system comprises a magnet of ring-shaped having an inner peripheral area and an outer peripheral area.

15. The electroacoustic transducer of claim 14 wherein said useful magnetic field is located at said inner peripheral area while said stray magnetic field is located at said outer peripheral area.

16. The electroacoustic transducer of claim 15 wherein said one or more second coils are arranged at said outer peripheral area and coaxially with said magnet.

17. The electroacoustic transducer of claim 16 wherein said one or more second coils are mounted to be movable parallel to an axis of said magnet.

18. The electroacoustic transducer of claim 13 wherein said sound generating means further comprises a diaphragm activated by said first coil to produce said acoustic sound wave.

19. The electroacoustic transducer of claim 13 wherein said vibration means further comprises a metal part mechanically connected to said one or more second coils.

20. The electroacoustic transducer of claim 19 wherein said metal part consists of a soft-magnetic material.

* * * * *